United States Patent [19]

Pines

[11] 4,442,457

[45] Apr. 10, 1984

[54] CHARGE COUPLED DEVICE FOCAL ZOOM
[75] Inventor: Michael Y. Pines, Los Angeles, Calif.
[73] Assignee: Hughes Aircraft Company, El Segundo, Calif.
[21] Appl. No.: 331,505
[22] Filed: Dec. 17, 1981
[51] Int. Cl.³ .............................................. H04N 3/15
[52] U.S. Cl. .................................... 358/213; 358/227
[58] Field of Search .................. 358/213, 227; 357/24, 357/30, 31

[56] References Cited

U.S. PATENT DOCUMENTS

| 4,245,240 | 1/1981 | Tanaka | 358/213 |
| 4,306,252 | 12/1981 | Fearnside | 358/213 |
| 4,336,557 | 6/1982 | Koch | 358/213 |
| 4,383,274 | 5/1983 | Inuiya | 358/227 |

Primary Examiner—Michael A. Masinick
Attorney, Agent, or Firm—Mark J. Meltzer; W. J. Bethurum; A. W. Karambelas

[57] ABSTRACT

The charge coupled device focal zoom of the present invention is used in connection with a time delay and integration charge coupled device imager in which a plurality of detectors is scanned at an angular rate $\omega$ across a field of view subtended by a scanning angle $\alpha$, wherein output charge from the detector array is clocked through associated charge coupled device registers at a clock frequency $f_{ccd}$ in synchronism with the scanning motion. A video display receiving the signal from the charge coupled device register may zoom in on a small portion of the field of view subtended by a reduced angle $\alpha/n$. This is accomplished by restricting the scanning angle to the reduced angle $\alpha/n$ and simultaneously reducing the CCD clocking frequency to $f_{ccd}/n$ and the scanning rate to $\omega/n$. The resolution of the image is enhanced because the sampling time T is increased while at the same time the synchronism between charge transfer and scanning movement is maintained for all values of n. A frequency converter is provided at the output of the serial registers which periodically integrates output charge packets from the registers at a constant rate so that a video signal having a constant frequency is output to video display electronics even though the zoom magnification factor n is varied.

12 Claims, 11 Drawing Figures

CHARGE COUPLED DEVICE FOCAL ZOOM

TECHNICAL FIELD

This invention is related to charge coupled device imagers in which a focal zoom function is provided electronically without a zoom lens.

BACKGROUND OF THE INVENTION

Charge coupled device imagers are disclosed in Sequin et al., *Charge Transfer Devices*, Academic Press, New York, 1975 at pages 142-200. Such devices include time delay and integration (TDI) charge coupled device (CCD) imagers of the type disclosed by Erb et al., "Buried Channel Charge Coupled Devices For Infrared Applications", CCD Applications Conference, *Proceedings*, Sept. 18-20, 1973, San Diego, CA, pages 157-167 and in U.S. Patent application Ser. No. 194,204 filed Oct. 6, 1980 by Michael Y. Pines et al., entitled "Charge Coupled Device Automatic Responsivity Control Circuit" and assigned to the assignee of the present application. The foregoing disclosures by Sequin, Erb and Pines are incorporated herein by reference.

One problem with charge coupled device imagers is that any focal zoom magnification function must be provided by using typical zoom optics of the type found in prior art cameras. This is particularly disadvantageous given the awkwardness of such optical devices and given the present goal in the art of miniaturizing charge coupled device imagers and reducing their weight and cost.

SUMMARY OF THE INVENTION

In the present invention, a focal zoom function is provided completely electronically in a charge coupled device imager without requiring additional optical devices such as zoom lenses, etc. A small portion of the original field of view is "zoomed" so that it occupies an entire video frame. In accordance with the invention, in a time delay and integration charge coupled device (TDI CCD) imager an electronic zoom is provided by slowing the speed at which the focal plane is scanned across the field of view. Simultaneously, the CCD clock frequency is reduced by an equal proportion so as to maintain synchronism between charge transfer and optical scanning. The small portion of the field of view is "zoomed" because the angle subtended by the scan of the focal plane through the field of view is also reduced by a proportional amount. One advantage is that the image resolution is increased as the CCD clock frequency is reduced because the integration time for each image sample is increased proportionately. In other words, because the optical scanning and the charge transfer have been slowed down, more time is spent viewing each image sample, which increases the signal to noise ratio, thus enhancing the image. Whereas in the prior art expensive and bulky zoom lenses and associated optical hardware had to be provided in order to facilitate the focal zoom function in an imager, no such devices are necessary in the zoom system of the present invention.

BRIEF DESCRIPTION OF THE DRAWINGS

The invention is best understood by reference to the accompanying drawings of which.

Figure 3:
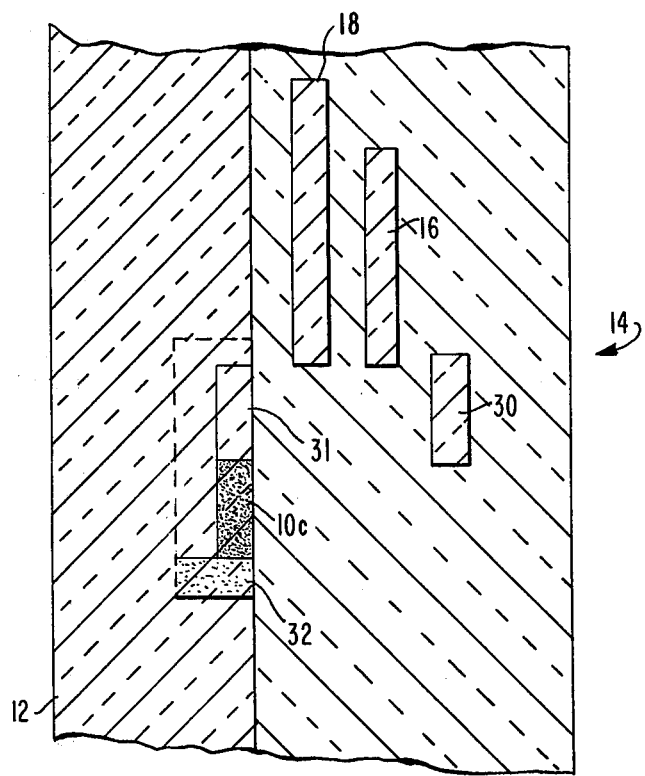
FIG. 3 is a cross-sectional view corresponding to FIG. 1 and taken along lines 3—3 of FIG. 1. cl DETAILED DESCRIPTION OF THE INVENTION Time delay and integration (TDI) charge coupled device (CCD) imagers enhance image quality by causing the field of view to be scanned across a plurality of TDI detector columns adjacent a CCD serial register. The transfer of charge in the serial register is controlled in synchronism with the scan so that the video signal is cumulative in the direction of scan, thus enhancing the signal-to-noise ratio of the resulting video signal. In such imagers, a zoom function may be desirable. As defined in this application, a zoom function is that which permits the imager to select a small portion of the original field of view and magnify it so that it fills the entire video display. In the prior art, the zoom function is performed by means of conventional optical devices such as an assembly of lenses which permit the imager to zoom in on a small selected area of the field of view. The disadvantage of such optical devices is that they are bulky.

In the present invention, the zoom function is provided electronically so that the need for zoom optical hardware or zoom lenses is completely eliminated. The invention illustrated in FIGS. 1 and 3 comprises a TDI CCD imager of the type well-known in the art, including a TDI column 10 of photodetectors 10a, 10b, 10c, etc. formed on the surface of a semiconductive substrate 12 and an adjacent CCD serial register 14 comprising a plurality of insulated upper level electrodes 16 and lower level electrodes 18 formed over the surface of the semiconductive substrate 12 and connected together in pairs, alternate pairs being connected to receive complementary clock signals $\phi_1$ and $\phi_2$.

Figure 1:
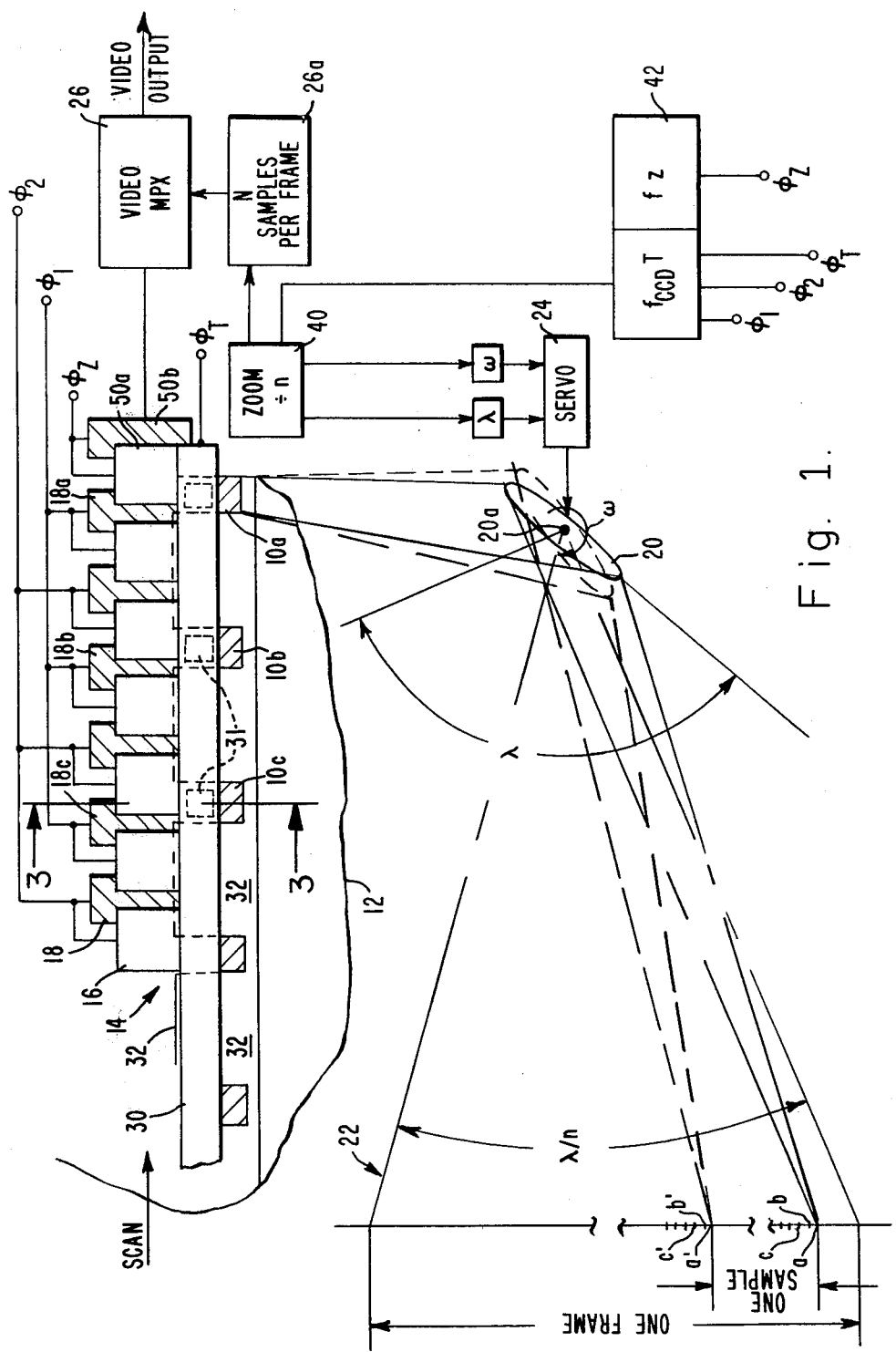
FIG. 1 is a simplified schematic and block diagram of a charge coupled device time delay and integration imager embodying the features of the present invention.

An optical device such as a mirror and lens combination 20 causes light from a field of view 22 to be scanned across the TDI column of detectors 10 from right to left in the drawing of FIG. 1 by rotating clockwise about its axis 20a under the control of a servo 24. Charge packets from the CCD serial register 14 are also transferred from left to right in synchronism with the scanning motion of the mirror 20, the charge packets being output into a video multiplexer 26 which provides a multiplexed video output signal utilized in video display electronics (not shown).

Ordinarily, the rotation of the mirror 20 about its axis 20a is limited by the servo 24 to be within an angle $\alpha$, the rotation being at a constant rate $\omega$ determined by the servo 24. The extent of the field of view 22 is defined by the angle $\alpha$.

Each detector 10a, 10b, etc. generates charge which is confined under control of transfer gate 30 to an individual area 31 defined by channel stops 32 adjacent each individual detector 10a, 10b, etc. Charge is thus accumulated adjacent each individual detector 10a, etc., the accumulation or integration of the charge thus forming a charge packet in each area 31 which is ultimately injected into the CCD serial register 14 under the control of a clock signal $\phi_t$ applied to the transfer gate 30. The frequency and pulse width of the clock signal $\phi_t$ determines the integration period T during which each detector 10a, etc. samples the field of view 22 and generates the accumulated charge. For example, when the mirror 20 is oriented in the solid line position indicated in FIG. 1, the detector 10a views a pixel (a) in the field of view 22 at the beginning of an integration period which commences when the clock signal $\phi_t$ is turned off. At the end of the integration period, when the clock signal $\phi_t$ is turned on, the mirror 20 has rotated to the dashed line position indicated in FIG. 1 so that the detector 10a is now focused on a different pixel (a') in the field of view 22. Thus, the width of one sample is the distance between the two pixels a and a', as indicated in FIG. 1, and the angle subtended by one sample is the product of the angular rate $\omega$ and the integration period T. At the end of the integration period, the charge packet accumulated in each area 31 adjacent each detector 10 is ejected beneath the transfer gate 30 into a surface potential well in the semiconductive substrate 12 formed beneath a corresponding CCD serial register electrode 18. The next integration period begins as soon as the clock signal $\phi_t$ is again turned off and the scan across the field of view 22 continues in an upward direction as indicated in FIG. 1.

This operation is best understood by reference to FIGS. 2a, 2b, 2c, and 2d. FIG. 2a illustrates the angular orientation $\alpha$ of the mirror 20 as a function of time. FIGS. 2b and 2c illustrate the time domain waveforms of the clock signals $\phi_1$ and $\phi_2$ applied to alternate pairs of the upper and lower level electrodes 16 and 18 of the CCD serial register 14. FIG. 2d illustrates the time domain waveform of the clock signal $\phi_t$. In a preferred embodiment of the invention, the imager of FIG. 1 is a monolithic focal plane array in which the semiconductive substrate 12 is of n-type conductivity and each detector 10 is a region of a p-type conductivity and is appropriately biased in a manner well known in to those skilled in the art. In response to radiation from the field of view 22, each detector 10 generates positive charge which is accumulated as an individual charge packet beneath the transfer gate 30 in a corresponding integration area 31.

At time $t_1$ the transfer gate clock signal $\phi_t$ is at a low potential so that a potential well in the surface potential of the substrate 12 is formed beneath the transfer gate 30. Thus, as radiation is incident on each of the detectors 10, positive charge packets are individually accumulated in each integration area 31. At time $t_2$ the transfer gate clock signal $\phi_t$ is pulsed positively, thus ejecting the positive charge packets from the integration areas 31 beneath the transfer gate 30. Simultaneously at time $t_2$, the clock signal $\phi_1$ (applied to alternate ones of the lower level electrodes 18) is pulsed negatively, thus forming surface potential wells in the substrate 12 adjacent each of the individual detectors 10. Accordingly, each of the accumulated positive charge packets is ejected from beneath the transfer gate 30 and into a corresponding one of the surface potential wells or "buckets" in the CCD serial register 14. At time $t_3$ the transfer gate clock signal $\phi_t$ is again pulsed negatively to begin the next integration period.

In the present invention, the imager may cause a small portion of the field of view 22 subtended by a reduced angle, $\alpha/n$, to fill the entire video frame generated by the video multiplexer 26 without the use of any additional optics or lenses or other focusing means. Specifically, the zooming function of this invention is achieved by a controller 40 which responds to a selected integral value of n, n being the magnification factor of the zoom function. The controller causes the frequency $f_{ccd}$ of the clock signals $\phi_1$, $\phi_2$ and $\phi_t$ generated by a clock signal generator 42 to be reduced by the factor n while simultaneously reducing the angle of travel $\alpha$ and angular rate $\omega$ of the mirror control servo 24 by the same factor n. In this manner, the mirror now scans a reduced field of view subtended by the smaller angle $\alpha/n$ at a reduced angular rate $\omega/n$. The time delay and integration synchronism between charge transfer and optical scanning is maintained because the controller 40 reduces the frequency $f_{ccd}$ of the CCD clock signals $\phi_1$, $\phi_2$ and $\phi_t$ by the factor n.

The zoom controller 40 controls the number N of samples per video frame generated by the video multiplexer 26. Specifically, the zoom controller 40 causes the number N of samples per video frame used by the video mulitiplexer 26 to be reduced by the zoom magnification factor n, as indicated in FIG. 1. For this purpose, the video multiplexer 26 includes means 26a for storing the number N of samples per frame, the storing means 26a being controlled by the zoom controller 40. Accordingly, when the imager of this invention zooms in on a portion of the field of view subtended by the reduced angle $\alpha/n$, the following operational parameters are changed in response to commands from the zoom controller 40 as follows: $\alpha$ becomes $\alpha/n$; $\omega$ becomes $\omega/n$; the frequency $f_{ccd}$ of the clock signals $\phi_1$, $\phi_2$, $\phi_t$ becomes $f_{ccd}/n$; and, N becomes N/n.

The foregoing operation maintains the synchronism between mirror scanning rate and charge transfer rate in the serial register 14 for all values of n. This may be seen in the following algebraic derivation:

The angle $\alpha/n$ subtended by the rotation of the mirror 20 may be defined in the following equation:

$$\alpha/n = \omega/n(T)N/n, \tag{1}$$

where T is the integration period illustrated in FIG. 2d. From FIG. 2d, it is apparent that the integration period T is inversely proportional to the frequency $f_{ccd}/n$ of the clock signal $\phi_t$. Thus:

$$T = k/f_{ccd}/n, \tag{2}$$

where k is equal to approximately 1.

Substituting the latter equation into the former equation:

$$\alpha/n = \omega/n(k/f_{ccd}/n)N/n. \tag{3}$$

The factor n cancels from both sides of the equation so that equation (3) is independent of the factor n. Therefore, synchronism between charge transfer and mirror movement is maintained for all values of n.

Referring to FIGS. 2f, 2g, 2h and 2j, the time domain waveforms of the clock signals $\phi_1$, $\phi_2$, $\phi_t$ and mirror position $\alpha$ is illustrated for the case in which n=4. Note that the frequency of each of the clock signals $\phi_1$, $\phi_2$, $\phi_t$ has been reduced by a factor of 4 while the angular rate and subtended angle have also been reduced by a factor of 4. In this case, the smaller field of view subtended by the reduced angle $\alpha/n$ defines the zoomed video frame comprising a reduced number of samples $N/n$.

ZOOM INTEGRATOR

Figure 2:
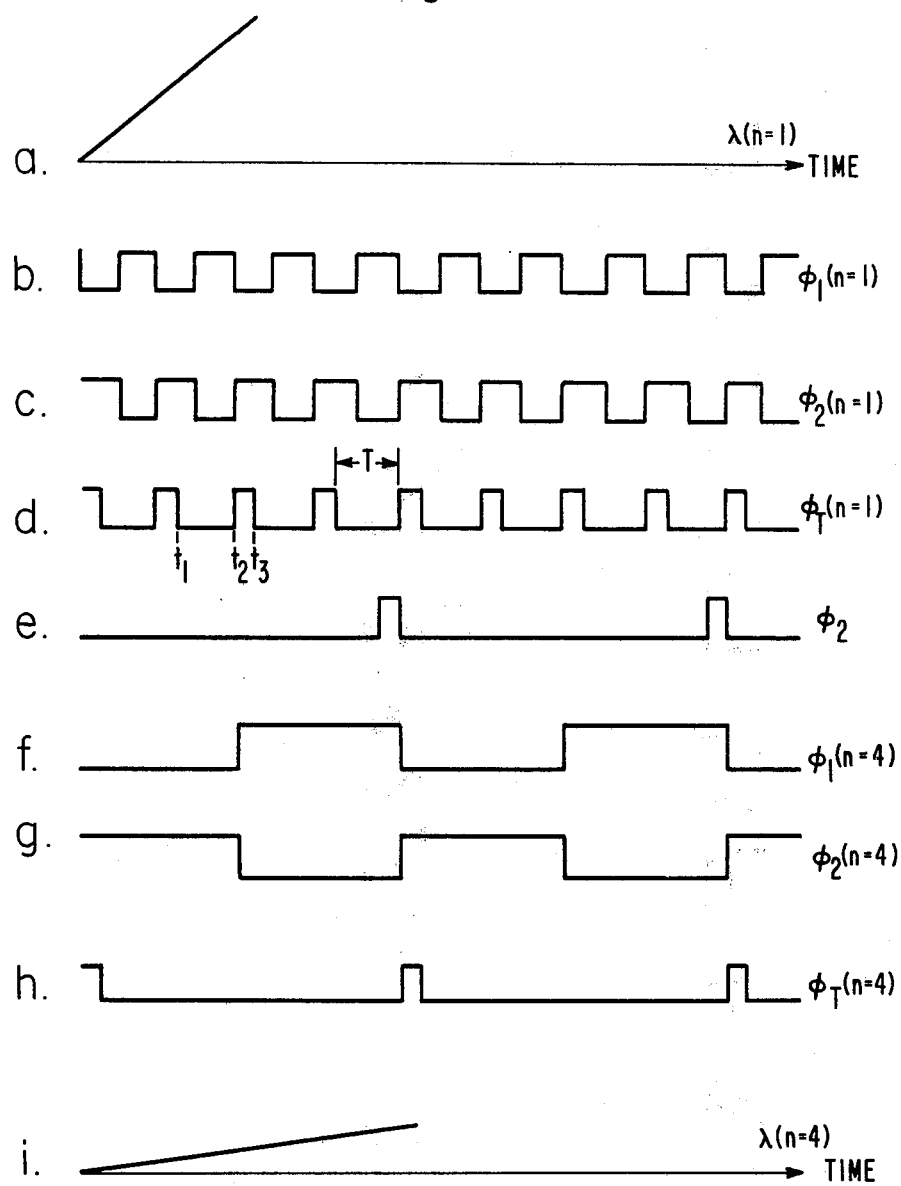
FIG. 2a illustrates the mirror rotation through the angle $\alpha$ as a function of time in the absence of zoom magnification.
FIGS. 2b, 2c and 2d are diagrams of the clock signals $\phi_1$, $\phi_2$ and $\phi_T$ respectively, each being of frequency $f_{ccd}$ for the case in which there is no zoom magnification.
FIG. 2e is a diagram of the time domain waveform of the clock signal $\phi_z$ which is of a constant frequency $f_z$.
FIGS. 2f, 2g and 2h are diagrams of the clock signals $\phi_1$, $\phi_2$ and $\phi_T$ respectively, each being of frequency $f_{ccd}/4$ for the case in which a zoom magnification of 4 is selected.
FIG. 2i illustrates the mirror rotation corresponding to FIGS. 2f-2h.

As illustrated in the clock diagrams of FIG. 2, the frequency $f_{ccd}/n$ of charge transfer in the serial register 14 is decreased in proportion to the zoom magnification factor n. Accordingly, the video signal emerging from the serial register 14 changes frequency $f_{ccd}/n$ whenever the zoom magnification factor n is changed. In most video systems, it is desirable that the video multiplexer 26 generate a video output signal of a constant frequency which is selected to be compatible with the video display electronics (not shown in FIG. 1). Somehow the frequency of the video output signal must be maintained constant for all values of n. For this purpose, a zoom integrator 50 comprising upper and lower level electrodes 50a, 50b is disposed over the substrate 12 at the output end of the serial register 14. The zoom integrator 50 integrates the charge packet output from the serial register 14 at a rate proportional to the zoom magnification ratio n in such a manner that the frequency of the signal output from the integrator 50 to the video multiplexer 26 is constant for all values of n. This zoom integration function is realized by applying the clock signal $\phi_z$ illustrated in FIG. 2e to the zoom electrodes 50a and 50b.

The frequency $f_z$ of the clock signal $\phi_z$ is the same for all values of n. For the case in which n=1, FIG. 2e illustrates that four buckets of charge are integrated beneath the zoom integrator electrodes 50a, 50b before an integrated charge packet is ejected from beneath the zoom integrator electrodes 50a, 50b to the video multiplexer 26. This may be easily seen by comparing the waveform of the clock signal $\phi_z$ illustrated in FIG. 2e with the waveforms of the clock signals $\phi_1$, $\phi_2$ illustrated in FIGS. 2b, 2c respectively. For the case in which n=4, FIG. 2i illustrates that only one charge packet is held beneath the zoom integrator electrodes 50a, 50b before it is output to the video multiplexer 26. This may be seen by comparing the waveform of the clock signal $\phi_z$ illustrated in FIG. 2e with the waveforms of the clock signals $\phi_1$, $\phi_2$ illustrated in FIGS. 2f and 2g. Accordingly, the integrator 50 feeds charge packets to the multiplexer 26 at a constant frequency $f_z$ for all values of n.

In the operational scheme illustrated in FIGS. 2a–2j, the maximum magnification factor n achievable is 4. If it is desired to increase the maximum possible zoom factor n to, for example, 8, the number of buckets integrated by the zoom integrator 50 for the case in which n=1 would have to be increased to 8. Thus, in general, if it is desired to increase the maximum zoom magnification factor n by a factor 2, the CCD clock frequency $f_{ccd}$ may be doubled. To triple the zoom factor, the clock frequency $f_{ccd}$ would be tripled. Accordingly, it may be stated generally that the maximum selectable value $n_{max}$ of the magnification n is given by $n_{max} = f_{ccd}/f_z$, where $f_{ccd}$ is the frequency of the clock signals $\phi_1$, $\phi_2$ for the case in which n=1, and $f_z$ is the constant frequency of the zoom clock signal $\phi_z$.

As explained previously in connection with the equations derived above, it is necessary to decrease the CCD clock frequency $f_{ccd}$ by the same factor n by which the angular travel $\alpha$ and angular rate $\omega$ are also decreased in order to maintain the time delay and integration of charge packets in the CCD register 14 described previously. However, it may not be immediately apparent why the number N of samples per frame controlled by the video multiplexer 26 must also be decreased by the magnification factor n. The reason that the number N of samples per video frame must be decreased is that the size of each sample illustrated in FIG. 1 remains constant for all values of n. This follows from the fact that the integration period $(T=k/f_{ccd}/n)$ and the angular rate $(\omega/n)$ are increased and decreased, respectively, by the same factor n, so that the angle $\alpha_t$ subtended by the mirror 20 during one integration period T remains constant for all values of n. This feature has the advantage that the resolution of the image is increased in proportion to the zoom magnification factor n in accordance with the equations given above defining the integration period T. Thus, as the imager of FIG. 1 zooms in on a small portion of the original field of view, the image resolution is increased so that, as the image is magnified, the clarity is also increased and the ability to view smaller objects is enhanced, a significant advantage.

The CCD register 14 preferably comprises a serpentine charge coupled device serial register of the type disclosed in U.S. Patent application Ser. No. 331,504 filed Dec. 17, 1981 by George Domingo and entitled "Serpentine Charge Coupled Device" and assigned to the assignee of the present application, the disclosure of the Domingo application being incorporated herein by reference. In the serpentine CCD of the Domingo application, a large number of CCD buckets or charge packets are stored in serpentine fashion between adjacent detectors 10a, 10b, etc. As a result, the CCD clock frequency $f_{ccd}$ is greater for a given scanning rate $\omega$. Therefore, one advantage of using the serpentine CCD of the above-referenced Domingo application in combination with the CCD focal zoom of the present invention is that the increase in clock frequency $f_{ccd}$ accompanying the use of the serpentine CCD increases the maximum achievable magnification factor $n_{max}$ of the focal zoom, in accordance with the relationship between $n_{max}$ and $f_{ccd}$ described previously in this specification. Thus, n may be any integer 1, 1, 3,—, etc., up to $n_{max}$, the value of $n_{max}$ depending upon the clock frequency $f_{ccd}$.

What is claimed is:
1. A charge coupled device focal zoom comprising:
   a semiconductive substrate;
   a column of photodetector diodes formed in said substrate;
   a charge coupled device serial register adjacent said photodetector column, said register comprising a plurality of charge storage cells, certain ones of said cells periodically receiving charge from corresponding ones of said detectors in said column;
   means for serially transferring charge stored in said register through said register in serial succession in one direction in synchronism with a clock signal having a frequency $f_{ccd}$;
   means for scanning a field of view subtended by an angle $\alpha$ across said detector column at a scanning rate $\omega$ in synchronism with said charge transfer means; and
   means for reducing said scanning rate $\omega$, said clock signal frequency $f_{ccd}$ and said scan angle $\alpha$ by a zoom magnification factor n so that said scanning rate becomes $\omega/n$, said frequency $f_{ccd}$ becomes $f_{ccd}/n$ and said angle becomes $\alpha/n$.

2. The charge coupled device focal zoom of claim 1 wherein said charge packets transferred in said register comprise an output signal having a frequency corresponding to $f_{ccd}$ which varies with changes in said magnification factor n in response to said reducing means, said focal zoom further comprising means for generating a video signal of constant frequency $f_z$ from said output signal.

3. The charge coupled device focal zoom of claim 2 wherein said means for generating an output signal of constant frequency comprise means for accumulating said charge packets from said register in serial succession and periodically ejecting the accumulated charge at a constant frequency $f_z$.

4. The charge coupled device focal zoom of claim 1 further comprising means for periodically blocking charge flow between said detector column and said register to permit accumulation of charge packets from each of said detectors during an integration period T and for periodically injecting the accumulated charge from each of said detectors into corresponding ones of said cells of said register in synchronism with said transferring means.

5. The charge coupled device focal zoom of claim 2 wherein said constant signal generating means comprise an integrating electrode overlying a region of said substrate adjacent said register, said integrating electrode connected to receive a clock signal $\phi_z$ having a constant frequency $f_z$ whereby a charge storage potential well is formed in the surface potential of said substrate beneath said integrating electrode from which charge packets accumulated from said register are periodically ejected.

6. The charge coupled device focal zoom of claim 5 further comprising video display electronics receiving charge injected from said potential well by said integrating electrode.

7. The charge coupled device focal zoom of claim 4 wherein said detector charge blocking means injects said accumulated charge into said serial register storage cells at a frequency $f_t = 1/T$.

8. The charge coupled device focal zoom of claim 7 wherein said reducing means further reduces said frequency $f_t$ to $f_t/n$ in accordance with said zoom magnification ratio, whereby the integration period T is increased proportionately.

9. A charge coupled device focal zoom, comprising:
a semiconductive substrate;
a column of photodetector diodes formed in said substrate;
a charge coupled device serial register formed in said substrate adjacent said photodetector column, said register comprising a plurality of storage cells and having an output end, certain ones of said cells being located adjacent corresponding ones of said photodetector diodes so as to receive charge therefrom;
an insulated transfer electrode overlying said substrate and comprising means for controlling charge transfer from said photodetector diodes to said charge storage cells of said serial register;
means for receiving charge packets from said serial register output end and for generating a charge packet video output signal in response thereto of constant frequency $f_z$, comprising an insulated integrating electrode overlying said substrate adjacent said serial register output end:
means for scanning a field of view across said photodetector column in a direction parallel thereto; and
means synchronously controlling said serial register, said transfer electrode, said scanning means and said integrating electrode, so that said serial register transfers charge at a frequency $f_{ccd}/n$, said transfer electrode permits charge transfer at a frequency $f_t/n$ said scanning means scans through an angle $\alpha/n$ at an angular rate $\omega/n$ and said integrating electrode permits charge transfer at a constant frequency $f_z$, said synchronous controlling means further comprising means permitting zoom magnification by selecting n to be any integer between 1 and $f_{ccd}/f_z$.

10. The charge coupled device focal zoom of claim 9 wherein said serial register comprises a plurality of charge transfer electrodes and said synchronous controlling means comprise a clock signal generator for generating complementary clock signals $\phi_1$, $\phi_2$ of frequency $f_{ccd}/n$ and applying said complementary clock signals to said charge transfer electrodes, said clock signal generator generating a clock signal $\phi_z$ of constant frequency $f_z$ applied to said integrating electrode.

11. The charge coupled device focal zoom of claim 9 further comprising a video multiplexer connected to receive charge packets from beneath said integrating electrode, said video multiplexer comprising means for defining a video frame having N/n samples per frame in response to said synchronous controlling means, wherein said number of samples per frame is changed whenever said synchronous controlling means changes the factor n.

12. The focal zoom of claim 9 wherein said scanning means comprises an optical device comprising means for focusing a pixel from a field of view onto individual ones of said photodetector diodes and a servo associated with said optical device, said optical device rotating under the control of said servo through said angle $\alpha/n$ at said angular rate $\omega/n$ in response to said synchronous controlling means.

* * * * *